Dec. 9, 1969   M. A. MICHALSKI   3,483,401
TIMING CIRCUIT
Filed Sept. 21, 1966
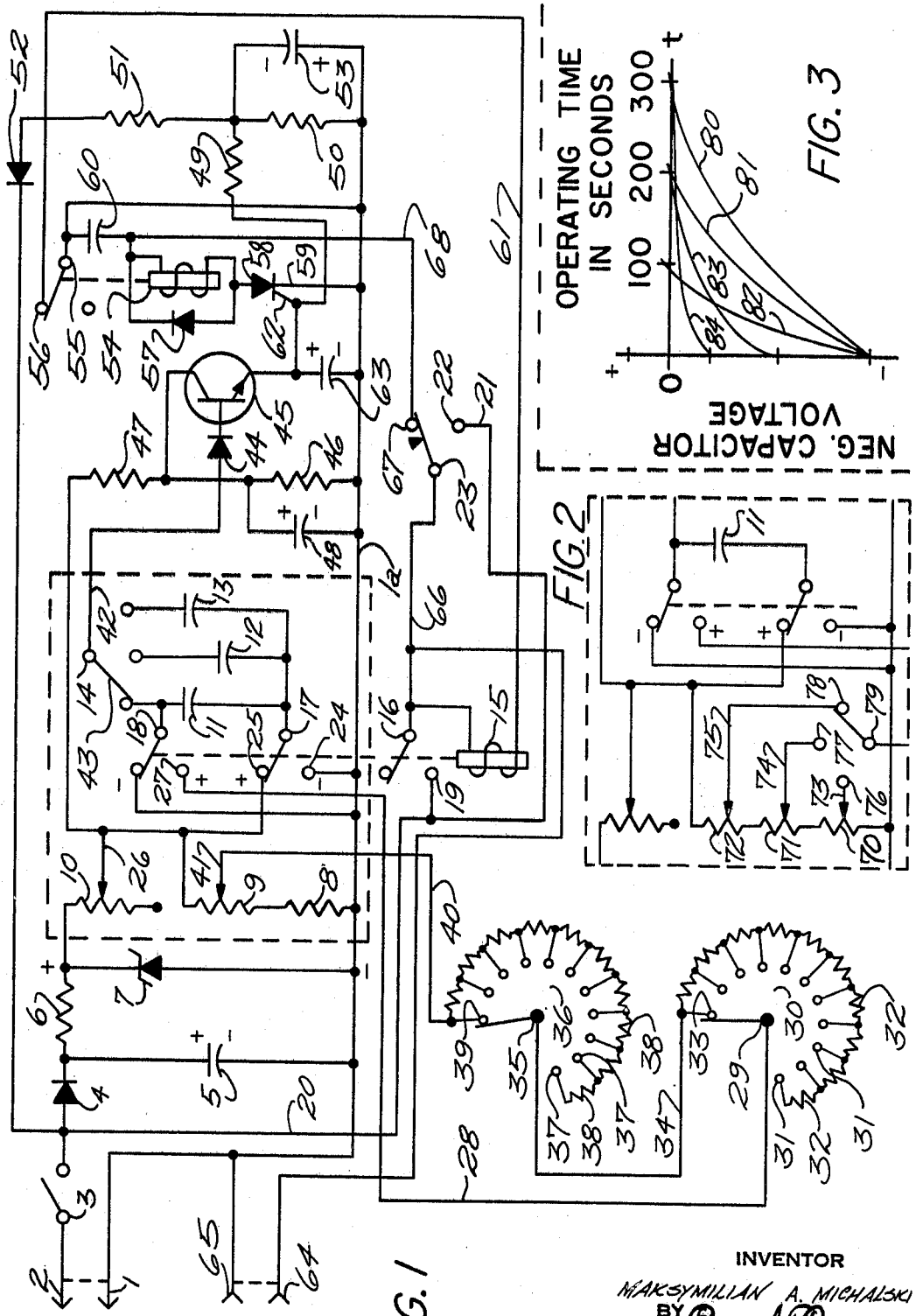
INVENTOR
MAKSYMILIAN A. MICHALSKI
BY
ATTORNEY

United States Patent Office 3,483,401
Patented Dec. 9, 1969

3,483,401
TIMING CIRCUIT
Maksymilian A. Michalski, Woodside, N.Y., assignor to Berkey Photo, Inc., New York, N.Y.
Filed Sept. 21, 1966, Ser. No. 581,032
Int. Cl. H03k *17/26, 17/28*
U.S. Cl. 307—293                                5 Claims

ABSTRACT OF THE DISCLOSURE

Timing circuit including switching means in one condition for charging a capacitor in one direction, switching means in a second condition for closing an output switch and for charging the capacitor in the reverse direction through a variable resistor calibrated in time units, the capacitor being charged in the reverse direction through the variable resistor thereby measuring a preset time interval, holding contact switching means to hold said switching means in said second condition until the end of the time interval at which time the holding contact switching means is released and the output switch opened, at the same time the holding contact switching means allows the switching means to return to normal or to the first condition charging the capacitor to the one direction ready to start the next time interval.

---

The present invention relates to electrical timing circuits and more particularly to an inexpensive timing circuit providing a timed output for a period ranging from one second to perhaps fifteen minutes in length.

Heretofore, timing circuits have been provided within the one second to fifteen minute range with an accuracy of five percent or less. However, in many cases, the components have been expensive and thus the timing circuits have not achieved a desired large volume of sales because of the restricted high price market.

The present invention aims to provide an inexpensive timing circuit which may be constructed of commercially available components.

In accordance with the invention a timing circuit is provided in which a capacitor is charged to one potential then discharged and charged to a potential of reverse polarity which may differ in magnitude from the charging potential. Timing interval starting means are provided to start the reversed charge on the capacitor simultaneously with the provision of an output voltage. The voltage of the reversed charge is amplified and used to control switching means to deenergize the output at the ends of selected predetermined intervals which may be set anywhere between one second to perhaps fifteen minutes.

In accordance with one embodiment of the invention a plurality of ranges is obtained by the switching of capacitors, while in another embodiment the plurality of ranges is obtained by switching the level of the reverse potential applied to a single capacitor.

Another object of the invention is to provide a timing circuit which is accurate within five percent or better and which is rugged in use.

Other objects and advantages of the invention will be apparent from the following description and from the accompanying drawings which show, by way of examples, embodiments of the invention.

In the drawings:
FIGURE 1 is a schematic diagram of a timing circuit in accordance with the invention which utilizes a plurality of capacitors for selecting ranges.

FIGURE 2 is a partial schematic diagram of another embodiment of a timing circuit in accordance with the invention, the portion of the circuit within dashed lines replacing the portion within the dashed lines of FIGURE 1. In this embodiment a plurality of voltage dividers are used for selecting ranges.

FIGURE 3 shows a series of curves illustrating operation of the two embodiments under various voltage levels and ranges.

Referring to the drawings there is shown in FIGURE 1 a timing circuit in accordance with the invention. The timing circuit is supplied through a pair of terminals 1 and 2 adapted to be connected to a source of alternating current which may be of the order of 120 volts. An on-off switch 3 is connected to one of the terminals such as to terminal 2 to energize and deenergize the circuit.

A rectified direct current power supply is provided by a rectifier 4, the direct current being filtered by a capacitor 5 and a resistor 6. A Zener diode 7 of appropriate voltage rating is connected across the direct current supply for the regulation thereof. A voltage divider including a resistor 8 and a potentiometer 9 is connected through the movable contact of a potentiometer 10 across the direct current supply.

A plurality of timing capacitors 11, 12 and 13 are selectively connected in parallel through a switch 14 which may be actuated to selectively connect capacitor 11 in parallel with capacitor 12, and capacitor 13 in parallel with capacitors 11 and 12.

A first switching means relay 15 is adapted to actuate double throw switches 16, 17 and 18 simultaneously. Lower contact 19 of switch 16 is connected to one of the alternating current supply terminals by a lead 20 and by a lead 21 to one terminal 22 of a timing interval starting switch 23. The other terminal of the double throw switch 16 is not used. Lower terminal 24 of the double throw switch 17 is connected to supply line 1a which in the connection shown is of negative polarity and is used as a common bus. Upper contact 25 of the double throw switch 17 is connected to movable contact 26 of the potentiometer 10. Lower contact 27 of the double throw switch 18 is connected by a lead 28 to movable contact 29 of a ten second interval timing selector switch 30 having contacts 31 connected to the connection between series connected resistors 32. End contact 33 of the selector switch 30 is connected by a lead 34 to movable contact 35 of a one second interval timing selector switch 36 having contacts 37 connected to the connection between series connected resistors 38. End contact 39 of the selector switch 36 is connected by a lead 40 to a movable contact 41 of the potentiometer 9. The resistors 32 are preferably ten times the values of the resistors 38.

A potential sensing lead 42 is connected from range setting contact arm 43 of the switch 14 through a rectifier 44 to the base of an amplifying transistor 45. Positive collector potential for the transistor 45 is provided by a voltage divider including resistors 46 and 47 connected between the negative bus 1a and the positive direct current supply at the contact arm 26 of the potentiometer 10. A filtering capacitor 48 is connected across the resistor 46.

Negative emitter bias for the transistor 45 is provided through a voltage dropping resistor 49 connected to the midpoint of a voltage string including resistors 50 and 51 connected in series with a rectifier 52 poled to provide a negative potential on the resistor 49. A filtering capacitor 53 is connected across the resistor 50.

A timing interval end relay 54 is adapted to be energized to open normally closed contacts 55 and 56. The coil of the relay 54 is bypassed by a diode 57 to prevent relay coil surges from reaching a controlled rectifier 58 connected in series with the relay 54 and to the common bus 1a by a lead 59. A spike suppressing capacitor 60 is connected from one end of the relay coil of relay 54 to the common bus 1a. Contact 56 of the relay 54 is connected to the coil of relay 15 by a lead 61.

Gate electrode 62 of the controlled rectifier 58 is connected to the negative emitter bias of transistor 45. An electrolytic capacitor 63 is connected between the gate electrode 62 and the common bus 1a and poled as indicated with its positive terminal connected to the gate 62. The electrolytic capacitor 63 has its positive terminal connected to the negative bias for stabilized operation.

Timed output terminals 64 and 65 are provided, terminal 64 being connected by lead 66 to the movable contact of the timing interval starting switch 23 and terminal 65 being connected to the common bus 1a. Contact 67 of the timing interval starting switch 23 is connected to one end of the coil for the relay 54 by a lead 68.

The following circuit components were used in an illustrative exemplification of the invention as set out in FIGURE 1 and are given by way of example:

| | |
|---|---|
| Transistor 45 | GE 2N2925. |
| Silicon cotnrolled rectifier 58 | GE C6B. |
| Silicon rectifiers 4, 52, 5, 57 | Solitron #CER69. |
| Mylar capacitors 11, 12, 13 | 2 mfd. 100 v. D.C. ±1%. |
| Zener diode 7 | Solitron, IR120A. |
| Resistor 6 | 10K, 1 w., ±10%. |
| Potentiometers 9, 10 | 200K, ½ w. |
| Resistor 8 | 330K, ½ w. |
| Resistor 47 | 560K, ½ w. |
| Resistor 46 | 150K, ½ w. |
| Resistor 51 | 510K, ½ w. |
| Resistor 50 | 10K, ½ w. |
| Resistor 49 | 1M, ½ w. |
| Resistor 32 | 680K, ½ w., ±5%. |
| Resistor 38 | 608M, ½ w., ±5%. |
| Electrolytic capacitor 5 | 10 mfd., 250 v., D.C. |
| Electrolytic capacitor 48 | 25 mfd., 50 v., D.C. |
| Electrolytic capacitors 53, 63 | 50 mfd., 15 v., D.C. |
| Paper capacitor 60 | .01 mfd., 600 v., D.C. |
| Rotary switches 30, 36 | 11 position, 1 pole. |
| Shorting switch 14 | 3 position. |
| Push button switch 23 | 3 P. D.T., 110 v. A.C. |
| Toggle or slide switch 3 | 5 P. D.T. |
| Miniature coil relay 15 | 5 P. S.T. |
| Miniature coil relay 54 | 5 D. S.T. |

In the operation of the timing circuit shown in FIGURE 1 switch 3 is closed to energize the circuit, a regulated positive potential being provided across the Zener diode 7. Before the start of a timing interval the double throw switches 16, 17 and 18 are positioned upwardly. Thus a positive potential is applied to the upper ends of at least one of the capacitors 11, 12 and 13, depending upon the position of the range setting contact arm 43. The capacitors 11, 12 and 13 are charged to a desired voltage set during manufacture by adjusting the contact arm of the potentiometer 10 so as to provide a desired regulated voltage across the capacitors 11, 12 and 13.

Upon the closing of the timing interval starting switch 23, an alternating current potential is applied to the coil of the relay 15 causing the double throw switches 16, 17 and 18 to be moved to their lower position, thereby through switch contact arm 16 applying alternating current potential to the output terminal 64 and through the coil of relay 15 connected in a self-interlocking circuit. At the same time the double throw switches 17 and 18 are switched to the lower contacts 24 and 27 reversing the potential applied to the capacitors 11, 12 and 13. This reversed potential may differ from the charging potential in magnitude, being lower or higher, depending upon the values of the resistors 8, 9 and 10. The reversed potential is applied to the capacitors through the resistors of the ten and one second interval selector switches 30 and 36 which are set to a desired time interval. The capacitors 11, 12 and 13 thus discharge against the voltage of reversed polarity and are recharged in the opposite direction. When their potential, as sensed through the lead 42, is slightly positive, the transistor 45 is driven into conduction producing a positive potential at the gate 62 of the controlled rectifier 58 triggering the rectifier into conduction. Thus the coil of the relay 54 is energized to open contacts 55 and 56 thereby deenergizing the interlocked coil of relay 15 so as to disconnect the alternating current supply from the output terminal 65 and ending the timed cycle.

During final adjustment after manufacture of the timing circuit, a series of readings are taken for various timed intervals and the potentiometer 9 is set to equalize the variation in tolerances of the timing capacitors 11, 12 and 13 and timing resistors 32 and 38 switched by the ten and one second interval timing selector switches 30 and 36.

The range of the timing circuit is doubled by switching the capacitor 12 in parallel with the capacitor 11 and trebled by switching the capacitor 13 in parallel with the capacitors 11 and 12. Thus the timing circuit provides a uniform series of timed outputs varying in length from one second to 330 seconds using capacitors and resistors of the values set out.

In both FIGURES 1 and 2 the accuracy of the timing depends upon the tolerances of the components used for the timing capacitors 11, 12 and 13, and the resistors 32 and 38; whch as commercially produced, usually vary plus or minus five percent. Of course, greater accuracy may be achieved by using capacitors and resistors of better tolerances. However, the repeatability of the timing cycles is very accurate, in fact, within less than one percent in variation even using capacitors and resistors of five percent tolerance.

Another embodiment of the invention is shown in FIGURE 2 in which a single capacitor is used. The three ranges of the timing circuit are achieved by switching between a plurality of voltage levels for the discharge of the capacitor against the reversed polarity by means of potentiometers 70, 71 and 72. Contact arms 73, 74 and 75 of the potentiometers 70, 71 and 72 respectively are connected to successive terminals 76, 77 and 78 of a selector switch 79. The operation of the embodiment shown in FIGURE 2 is similar to that shown in FIGURE 1 excepting that only a single capacitor 11 is required, the ranges being covered by actuating the selector switch 79.

The operation of the timing circuit may be shown by referring to curves 80–84 inclusive of FIGURE 3 in which operating time in seconds is plotted against negative potential applied to the capacitor 11 and which illustrate the operation of the two different embodiments of the invention. Curve 82 indicates the relationship between operating voltage and the timed interval using capacitor 11 alone in the circuit of FIGURE 1 and in the circuit of FIGURE 2 with contact 75 closed. Curve 81 indicates the operation with capacitors 11 and 12 connected in parallel in the circuit of FIGURE 1. Curve 80 indicates the operation of capacitors 11, 12 and 13 connected in parallel using the circuit of FIGURE 1. Curves 83 and 84 apply to FIGURE 2 with contacts 74 and 73 closed respectively.

While the invention has been described and illustrated with relation to specific embodiments thereof, it will be understood that other embodiments may be resorted to without departing from the invention. Therefore, the invention set out above should be considered as illustrative and not as limiting the scope of the following claims.

I claim:
1. A timing circuit comprising a source of voltage, a capacitor, first relay switching means normally in one condition when deenergized connecting the source of voltage to the capacitor to establish a potential of one polarity thereon, variable resistive means calibrated in time units, said first relay switching means operative when energized in a second condition connecting said potential in reversed direction to said capacitor in series with said variable resistive means for the discharge of said capacitor through said variable resistive means against said reversed potential and for the charging of said capacitor to a potential of opposite polarity, holding contact switching means operative when said first relay switching means is energized to hold said first relay in said second condition, output terminal means, timing interval starting switch means including circuit energizing means for said first relay switching means, said timing interval starting switch means operative to actuate said first switching means to said second condition thereby to apply potential to said output terminal means, and output switching means including a controlled rectifier and a transistor amplifier for the control thereof, a normally deenergized relay connected to be energized by said controlled rectifier, and normally closed contacts connected in series with said holding contact switching means, said output switching means responsive to a predetermined value of said opposite polarity potential to disconnect potential from said holding contact switching means and from said output terminal means.

2. A timing circuit according to claim 1 in which a plurality of capacitors are provided and selective switching means is connected to the capacitors to adjustably switch in one or more of the capacitors so that a plurality of timing ranges is provided.

3. A timing circuit according to claim 1 in which a voltage divider with a plurality of taps is connected across said voltage source, and selective switching means is connected between said taps and the first switching means so that a plurality of voltage levels are obtained, said potential in reversed direction being provided by said tapped voltage divider.

4. A timing circuit according to claim 1 in which said potential in reversed direction differs in magnitude from said source potential.

5. A timing circuit according to claim 1 in which said potential in reverse direction is less in magnitude than said source potential.

References Cited

UNITED STATES PATENTS

| | | | |
|---|---|---|---|
| 2,579,163 | 12/1951 | Wald et al. | 328—129 X |
| 2,607,907 | 8/1952 | Marshall | 328—131 |
| 3,168,658 | 2/1965 | Marshall | 307—293 |
| 3,309,594 | 3/1967 | Bett et al. | 307—293 |

JOHN S. HEYMAN, Primary Examiner

R. C. WOODBRIDGE, Assistant Examiner

U.S. Cl. X.R.

307—294; 328—78, 129, 131